United States Patent
Dierking (10) Patent No.: US 12,132,828 B2
(45) Date of Patent: *Oct. 29, 2024

(54) SYSTEM AND METHOD FOR IMPROVED SECURITY IN ADVANCED METERING INFRASTRUCTURE NETWORKS

(71) Applicant: Aclara Technologies LLC, St. Louis, MO (US)

(72) Inventor: Timothy Dierking, Kirkwood, MO (US)

(73) Assignee: Aclara Technologies LLC, St. Louis, MO (US)

(*) Notice: Subject to any disclaimer, the term of this patent is extended or adjusted under 35 U.S.C. 154(b) by 135 days.

This patent is subject to a terminal disclaimer.

(21) Appl. No.: 17/898,433

(22) Filed: Aug. 29, 2022

(65) Prior Publication Data

US 2023/0106387 A1 Apr. 6, 2023

Related U.S. Application Data

(63) Continuation of application No. 16/848,177, filed on Apr. 14, 2020, now Pat. No. 11,431,485.

(Continued)

(51) Int. Cl.
*H04L 29/06* (2006.01)
*G06F 21/00* (2013.01)
(Continued)

(52) U.S. Cl.
CPC .......... *H04L 9/0841* (2013.01); *H04L 9/0643* (2013.01); *H04L 9/0869* (2013.01);
(Continued)

(58) Field of Classification Search
None
See application file for complete search history.

(56) References Cited

U.S. PATENT DOCUMENTS

| 11,069,082 B1* | 7/2021 | Ebrahimi Afrouzi .. H04N 23/56 |
| 2003/0084279 A1* | 5/2003 | Campagna .......... H04L 63/0823 |
| | | 713/153 |

(Continued)

FOREIGN PATENT DOCUMENTS

| EP | 2 634 993 A1 | 9/2013 |
| EP | 3 291 481 A1 | 3/2018 |

(Continued)

OTHER PUBLICATIONS

PCT/US2020/028087 International Search Report and Written Opinion dated Jul. 2, 2020 (14 pages).

(Continued)

*Primary Examiner* — Lisa C Lewis
(74) *Attorney, Agent, or Firm* — Michael Best & Friedrich LLP (57) ABSTRACT

A system includes at least one processor to receive a second public key, a first random number, and a second random number, and store the second public key, the first random number, and the second random number in an installation record, perform key agreement with a first private key and the second public key to determine a MasterSecret, perform key expansion with the MasterSecret, the first random number, and the second random number to generate a client authentication key, a server authentication key, a client encryption key, and a server encryption key, and store the client authentication key, the server authentication key, the client encryption key, and the server encryption key and delete the MasterSecret.

20 Claims, 5 Drawing Sheets

Related U.S. Application Data (60) Provisional application No. 62/834,048, filed on Apr. 15, 2019.

(51) Int. Cl.
  *H04L 9/06* (2006.01)
  *H04L 9/08* (2006.01)
  *H04L 9/30* (2006.01)

(52) U.S. Cl.
  CPC .......... *H04L 9/0891* (2013.01); *H04L 9/0894* (2013.01); *H04L 9/3073* (2013.01); *H04L 2209/24* (2013.01)

(56) References Cited

U.S. PATENT DOCUMENTS

| | | | |
|---|---|---|---|
| 2003/0108204 A1 | 6/2003 | Audebert et al. | |
| 2005/0251680 A1* | 11/2005 | Brown | H04W 12/069 713/171 |
| 2009/0287922 A1* | 11/2009 | Herwono | H04L 9/321 380/279 |
| 2010/0100740 A1* | 4/2010 | Ho | H04W 12/06 713/171 |
| 2010/0104102 A1* | 4/2010 | Brown | H04L 9/3215 380/277 |
| 2011/0158411 A1 | 6/2011 | Medvinsky et al. | |
| 2013/0232554 A1 | 9/2013 | Campagna et al. | |
| 2015/0365238 A1 | 12/2015 | Hui et al. | |
| 2021/0344511 A1* | 11/2021 | Devarajan | H04L 63/0281 |

FOREIGN PATENT DOCUMENTS

| | | |
|---|---|---|
| EP | 3 384 626 | 10/2018 |
| WO | 2017/095599 A1 | 6/2017 |

OTHER PUBLICATIONS

Supplementary European Search Report dated Dec. 13, 2022 for corresponding European Application No. 20790850.0.

* cited by examiner

SYSTEM AND METHOD FOR IMPROVED SECURITY IN ADVANCED METERING INFRASTRUCTURE NETWORKS

CROSS-REFERENCE TO RELATED APPLICATIONS

This application is a continuation of and claims priority to, U.S. patent application Ser. No. 16/848,177, filed Apr. 14, 2020, which claims priority to and the benefit of Provisional U.S. Patent Application No. 62/834,048, filed Apr. 15, 2019.

BACKGROUND

Computing devices that are connected to a network may be subject to potential compromise from malicious actors, hackers, and the like. As an example, network connected metering devices, such advanced metering infrastructure (AMI) devices may be connected to a network. During installation and setup, conventional AMI devices may be knowingly or unknowingly compromised by the malicious parties or actors. During installation, a device that includes software that may be used to install and maintain an AMI device. However, it is possible that the software or device could be compromised with malicious software.

It is with these issues in mind, among others, that various aspects of the disclosure were conceived.

SUMMARY

According to one aspect, a system for providing improved security in advanced metering infrastructure (AMI) networks and securing an advanced metering infrastructure (AMI) device includes a client computing device, an advanced metering infrastructure (AMI) device, and a server computing device. The server computing device may generate a first key agreement key pair including a first private key and a first public key that corresponds to the first private key. The server computing device may load the key agreement key pair into the client computing device. In another example, the server computing device may only load the first public key into the client computing device. The client computing device may generate a first random number and then load the first random number and the first public key into the AMI device. The AMI device may generate a second random number and generate a second key agreement key pair including a second private key and a second public key that corresponds to the second private key. The AMI device may perform key agreement using the second private key and the first public key to determine a MasterSecret. Next, the AMI device may perform key expansion using the MasterSecret, the first random number, and the second random number to generate a plurality of security keys and store the plurality of security keys. The AMI device may then delete the MasterSecret. The client computing device may store the second public key, the first random number, and the second random number in an installation record associated with the AMI device. The server computing device may perform key agreement using the first private key and the second public key to determine the MasterSecret. The server computing device may perform key expansion using the MasterSecret, the first random number, and the second random number to generate the plurality of security keys and store the plurality of security keys. The server computing device may then delete the MasterSecret.

According to an aspect, a system includes a memory storing computer-executable instructions and at least one processor to execute the instructions to generate a first key agreement key pair comprising a first public key and a first private key corresponding to the first public key, load the first public key into a first client computing device, receive a second public key associated with a second key agreement key pair comprising the second public key and a second private key generated by a second client computing device, a first random number generated by the first client computing device, and a second random number generated by the second client computing device, and store the second public key, the first random number, and the second random number in an installation record associated with the second client computing device, perform key agreement with the first private key and the second public key to determine a MasterSecret, perform key expansion with the MasterSecret, the first random number, and the second random number, the second public key, and the first private key to generate a client authentication key, a server authentication key, a client encryption key, and a server encryption key, and store the client authentication key, the server authentication key, the client encryption key, and the server encryption key and delete the MasterSecret.

According to another aspect, a method includes generating, by at least one processor, a first key agreement key pair comprising a first public key and a first private key corresponding to the first public key, loading, by the at least one processor, the first public key into a first client computing device, receiving, by the at least one processor, a second public key associated with a second key agreement key pair comprising the second public key and a second private key generated by a second client computing device, a first random number generated by the first client computing device, and a second random number generated by the second client computing device, and storing the second public key, the first random number, and the second random number in an installation record associated with the second client computing device, performing, by the at least one processor, key agreement with the first private key and the second public key to determine a MasterSecret, performing, by the at least one processor, key expansion with the MasterSecret, the first random number, and the second random number, the second public key, and the first private key to generate a client authentication key, a server authentication key, a client encryption key, and a server encryption key, and storing, by the at least one processor, the client authentication key, the server authentication key, the client encryption key, and the server encryption key and deleting the MasterSecret.

According to an additional aspect, a non-transitory computer-readable storage medium includes instructions stored thereon that, when executed by a computing device cause the computing device to perform operations, the operations including generating a first key agreement key pair comprising a first public key and a first private key corresponding to the first public key, loading the first public key into a first client computing device, receiving a second public key associated with a second key agreement key pair comprising the second public key and a second private key generated by a second client computing device, a first random number generated by the first client computing device, and a second random number generated by the second client computing device, and storing the second public key, the first random number, and the second random number in an installation record associated with the second client computing device, performing key agreement with the first private key and the second public key to determine a MasterSecret, performing key expansion with the MasterSecret, the first random number, and the second random number, the second public key, and the first private key to generate a client authentication key, a server authentication key, a client encryption key, and a server encryption key, and storing the client authentication key, the server authentication key, the client encryption key, and the server encryption key and deleting the MasterSecret.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Aspects of a system and method for securing an advanced metering infrastructure (AMI) device include a client computing device that is in communication with an AMI device and a server computing device via a communication network. The server computing device may generate a first key agreement key pair including a first private key and a first public key that corresponds to the first private key. The server computing device may load the first public key into the client computing device. The client computing device may generate a first random number and then load the first random number and the first public key into the AMI device. The AMI device may generate a second random number and generate a second key agreement key pair including a second private key and a second public key that corresponds to the second private key. The AMI device may perform key agreement using the second private key and the first public key to determine a MasterSecret. Next, the AMI device may perform key expansion using the MasterSecret, the first random number, and the second random number to generate a plurality of security keys and store the plurality of security keys. The AMI device may then delete the MasterSecret. The client computing device may store the second public key, the first random number, and the second random number in an installation record associated with the AMI device. The server computing device may perform key agreement using the first private key and the second public key to determine the MasterSecret. The server computing device may perform key expansion using the MasterSecret, the first random number, and the second random number to generate the plurality of security keys and store the plurality of security keys. The server computing device may then delete the MasterSecret.

The existing conventional solution to protect key delivery to an AMI headend or server is to generate each AMI device key in a field programming tool. The key is then injected into the AMI device and encrypted by the field programming tool with the AMI headend public key. This approach has problems because the AMI key is exposed to compromise by the field programming tool and the interface between the field programming tool and the AMI device.

According to exemplary embodiments, Elliptic-curve Diffie-Hellman (ECDH) based key agreement may be facilitated by a client computing device, e.g., a field programming tool. However, the AMI key is not exposed to the field programming tool or the interface between the field programming tool and the AMI device. ECDH may be based on the Recommendation for Pair-Wise Key-Establishment Schemes Using Discrete Logarithm Cryptography as discussed in the NIST SP 800-56A Revision 3. As an example, the key agreement may be (Cofactor) Static Unified Model, C(0e, 2s, ECC CDH) Scheme according to the NIST SP 800-56A Revision 3, among others.

As discussed herein, an AMI device private key may be protected inside a hardware key store and ECDH operations may be performed within the hardware key store. In other examples, the ECDH operations may be performed by software. In further examples, the ECDH operations may be performed over another interface such as a network including an AMI network as discussed herein.

The ECDH based key agreement discussed herein allows the AMI network to be more secure from potential compromises. AMI device installation teams may be third-party contractors. Previous conventional solutions could be subverted, either knowingly or unknowingly, by the installer. The client computing device discussed herein, e.g., the field programming tool, executes software to be used to install and maintain the AMI device. However, the software and the field programing tool may be subject to compromise. Even if this is the case, ECDH based key agreement prevents exposure of the AMI key to the field programming tool. If the AMI key is compromised, each AMI device is to be visited to replace the AMI key.

Figure 1:
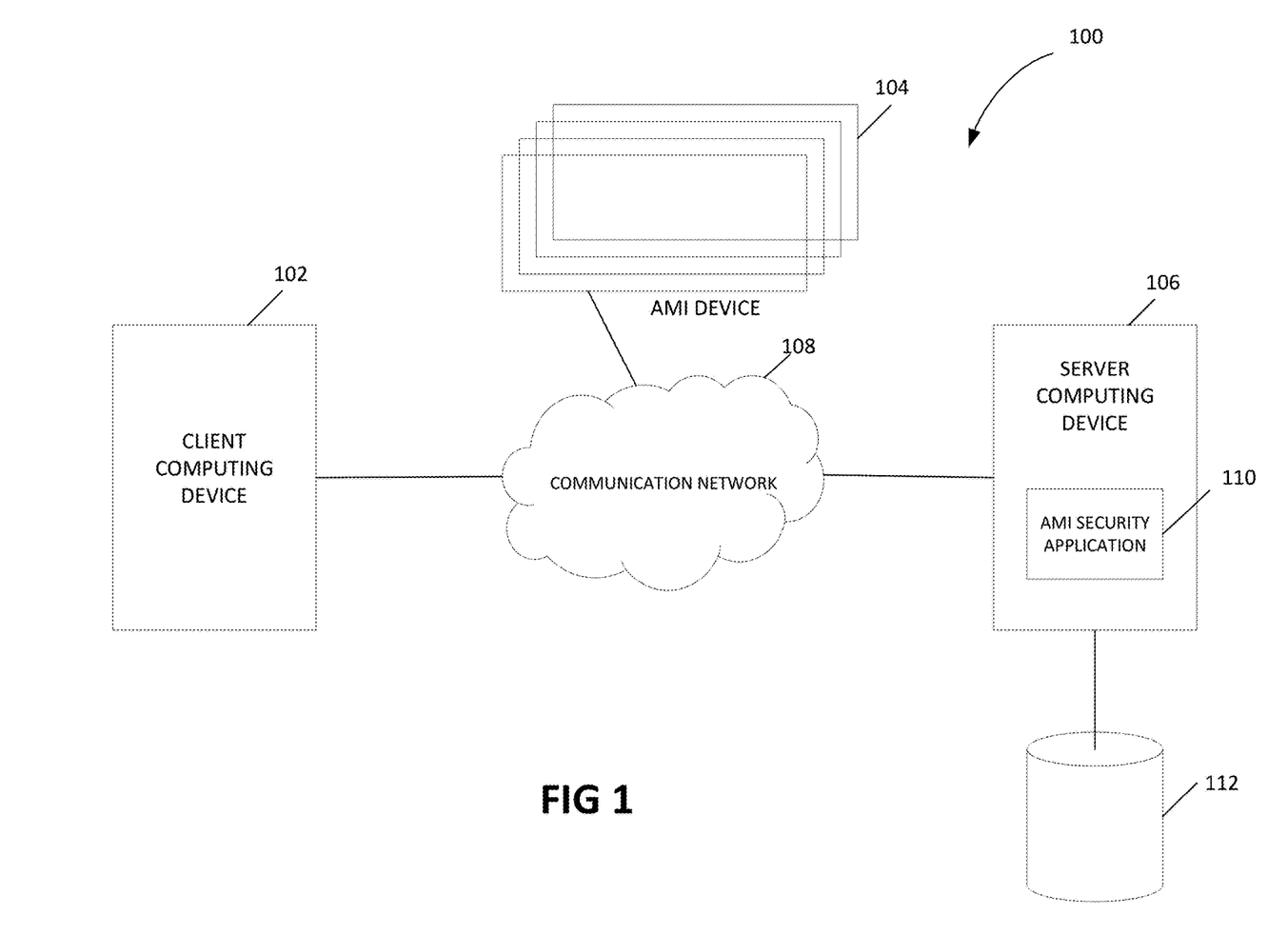
FIG. 1 is a block diagram of a system for improved security in advanced metering infrastructure (AMI) networks according to an example embodiment.

FIG. 1 shows a block diagram of a computing system comprising an advanced metering infrastructure (AMI) system 100 according to an example embodiment. The advanced metering infrastructure (AMI) system 100 includes at least one client computing device 102 and at least one advanced metering infrastructure (AMI) device 104 in communication with at least one server computing device 106 via a communications network 108. The at least one client computing device 102 may be a first client computing device such as a field programming device or tool for programming, installing, and maintaining the AMI device 104. The AMI device 104 may be a second client computing device that is a hardware device such as a smart meter (e.g. internet connected meter) that is associated with a utility system such as an electric utility system, a gas utility system, or a water utility system, among others. The at least one server computing device 106 may be an AMI server computing device, also known as an AMI headend.

The at least one client computing device 102, the at least one advanced metering infrastructure (AMI) device 104, and the at least one server computing device 106 may together provide and execute an advanced metering infrastructure (AMI) security application 110. The client computing device 102 may execute a first client component of the AMI security application 110, the AMI device 104 may execute a second AMI component of the AMI security application 110, and the server computing device 106 may execute a third component of the AMI security application 110. The server computing device 106 may be in communication with a relational database management system (RDBMS) or another type of database management system that stores and communicates data from at least one database 112.

The at least one database 112 may be a structured query language (SQL) database such as a MySQL database, a NoSQL database, or a MongoDB database, among others. The at least one database 112 may be integrated with the server computing device 106 or in communication with the server computing device 106.

The at least one client computing device 102 is configured to receive data from and/or transmit data to the AMI device 104 and the at least one server computing device 106 through the communications network 108. Although the at least one server computing device 106 is shown as a single server computing device, it is contemplated that the at least one server computing device 106 may include multiple server computing devices, for example in a cloud computing configuration.

The communications network 108 can be the Internet, an intranet, or another wired or wireless communications network. For example, the communications network 108 may include a Mobile Communications (GSM) network, a code division multiple access (CDMA) network, 3rd Generation Partnership Project (GPP) network, an Internet Protocol (IP) network, a wireless application protocol (WAP) network, a Wi-Fi network, a Bluetooth network, a satellite communications network, or an IEEE 802.11 standards network, as well as various communications thereof. Other conventional and/or later developed wired and wireless networks may also be used.

The at least one client computing device 102 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or a component of the AMI security application 110. In addition, the at least one client computing device 102 further includes at least one communications interface to transmit and receive communications, messages, and/or signals.

The at least one client computing device 102 can be a laptop computer, a smartphone, a personal digital assistant, a handheld computer, a tablet computer, a standard personal computer, or another processing device. The at least one client computing device 102 may include a display, such as a computer monitor, for displaying data and/or graphical user interfaces. The at least one client computing device 102 may also include a Global Positioning System (GPS) hardware device for determining a particular location of the client computing device 102, an input device, such as a camera, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The at least one client computing device 102 may display on the display a graphical user interface (or GUI) to generate a graphical user interface on the display. The graphical user interface may be provided by the AMI security application 110. The graphical user interface enables a user of the at least one client computing device 102 to interact with the AMI security application 110.

The AMI security application 110 may be a component of an application and/or service executable by the at least one client computing device 102, the AMI device 104, and/or the at least one server computing device 106. For example, the AMI security application 110 may be a single unit of deployable executable code or a plurality of units of deployable executable code. According to one aspect, the AMI security application 110 may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

The at least one AMI device 104 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or a component of the AMI security application 110. In addition, the at least one AMI device 104 further includes at least one communications interface to transmit and receive communications, messages, and/or signals.

The at least one server computing device 106 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or a component of the AMI security application 110. In addition, the at least one server computing device 106 further includes at least one communications interface to transmit and receive communications, messages, and/or signals.

Figure 2:
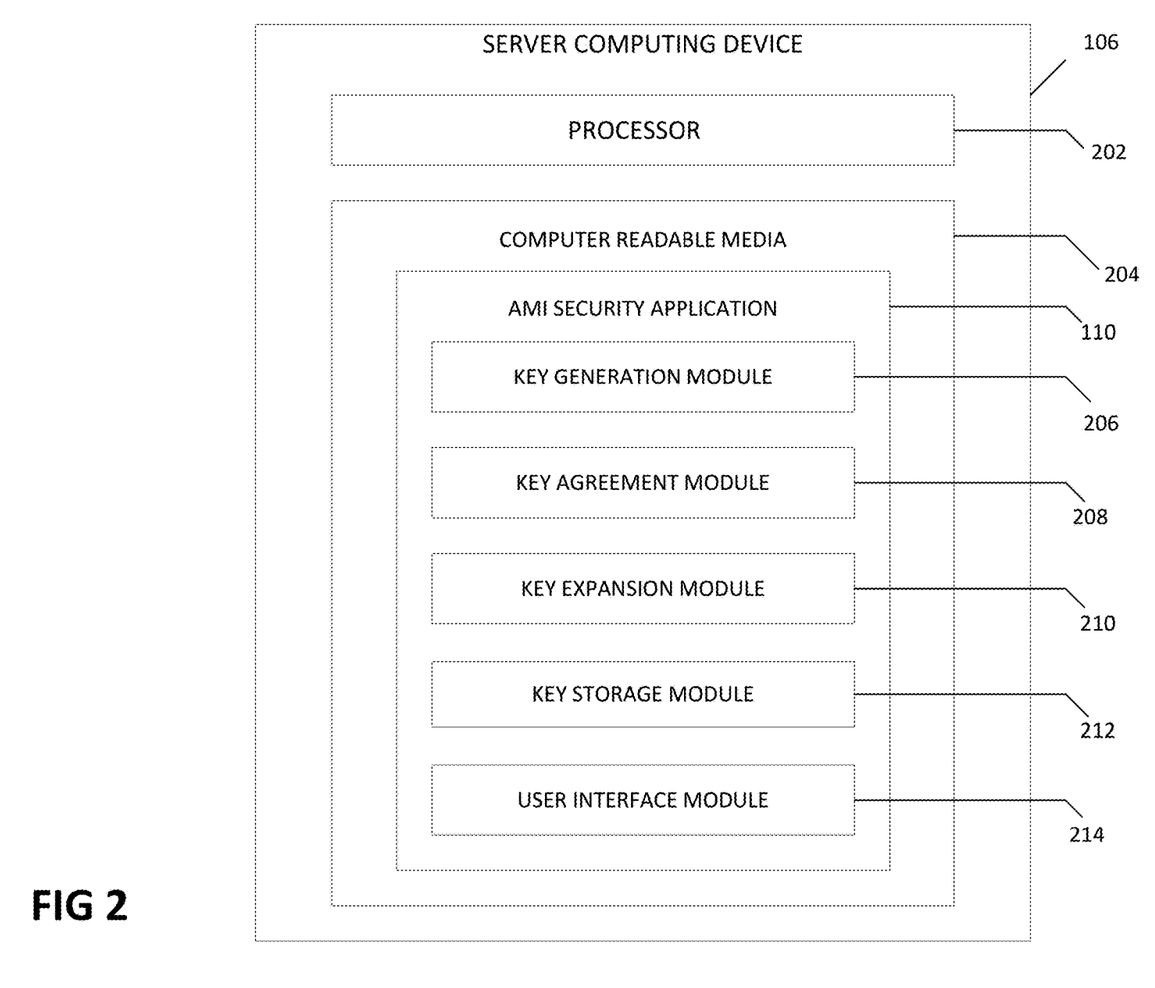
FIG. 2 shows a block diagram of a server computing device of the system according to an example embodiment.

FIG. 2 illustrates a block diagram of the server computing device 106 according to an example embodiment. The server computing device 106 includes at least one processor 202 and computer readable media (CRM) 204 in memory on which the AMI security application 110 or other user interface or application is stored. The computer readable media may include volatile media, non-volatile media, removable media, non-removable media, and/or another available medium that can be accessed by the processor. By way of example and not limitation, the computer readable media comprises computer storage media and communication media. Computer storage media includes non-transitory storage memory, volatile media, non-volatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The AMI security application 110 may include a key generation module 206 for generating a first key agreement key pair such as a first public key and a first private key corresponding with the first public key. In one embodiment, the first key agreement key pair may be an ECDH key agreement key pair based on ECDH. However, other encryption algorithms are also contemplated. In one embodiment, the first key agreement key pair may be generated by the server computing device 106. The key generation module 206 also may be used to generate a second key agreement key pair such as a second public key and a second private key corresponding with the second public key. In one embodiment, the second key agreement key pair is an ECDH key agreement key pair based on ECDH or another encryption algorithm. The second key agreement key pair may be generated by the AMI device 104.

The AMI security application 110 may include a key agreement module 208 for performing key agreement using a public key and a private key to generate a MasterSecret. The key agreement may be an ECDH key agreement or another type of key agreement. The MasterSecret may be an output of the key agreement and may be thirty-two bytes or another length.

The AMI security application 110 may include a key expansion module 210 for performing key expansion with the MasterSecret and at least one random number to generate ASCII text such as the following hexadecimal bytes: Ox6B657920657870616E73696F6E. The random number may be a random number generated and provided by the AMI device 104 or a random number generated and provided by the client computing device 102, e.g., the field programming tool. The key expansion module 210 may be used to perform key expansion using the MasterSecret, a first random number generated by the client computing device 102, and a second random number generated by the AMI device 104. The key expansion module 210 may generate a client authentication key, a server authentication key, a client encryption key, and a server encryption key.

As an example, the key expansion may be performed by the AMI device 104 and the server computing device 106 using a hash-based message authentication code (HMAC). The client authentication key may be generated using HMAC based on the MasterSecret, the first random number, and the second random number. The server authentication key may be generated using HMAC based on the client authentication key, the first random number, and the second random number. The client encryption key may be generated based on the server authentication key, the first random number, and the second random number. The server encryption key may be generated based on the client encryption key, the first random number, and the second random number.

In one embodiment, the client authentication key is determined based on the following: clientAuthKey=HMAC (MasterSecret, "key expansion"|firstRandomNumber|secondRandomNumber). Additionally, the server authentication key may be determined based on the following: serverAuthKey=HMAC (MasterSecret, "key expansion-"|clientAuthKey|firstRandomNumber|secondRandomNumber). Similarly, in one embodiment, the client encryption key may be determined based on the following: clientEncKey=HMAC (MasterSecret, "key expansion-|serverAuthKey|firstRandomNumber|secondRandomNumber). The server encryption key may be determined based on the following: serverEncKey=HMAC (MasterSecret, "key expansion"|clientEncKey|firstRandomNumber|secondRandomNumber).

The AMI security application 110 may include a key storage module 212 for storing a plurality of security keys for securing the AMI device 104 including at least one of the client authentication key, the server authentication key, the client encryption key, and the server encryption key.

In addition, the AMI security application 110 includes a user interface module 214 for displaying a user interface on the display of the client computing device 102 or another computing device. As an example, the user interface module 214 generates a native and/or web-based graphical user interface (GUI) that accepts input and provides output viewed by users of the client computing device 102. The client computing device 102 may automatically provide real-time and dynamically refreshed AMI security information, among other information. The user interface module 214 may send data to other modules of the AMI security application 110, and retrieve data from other modules of the AMI security application 110 asynchronously without interfering with the display and behavior of the user interface displayed by the client computing device 102.

Figure 3:
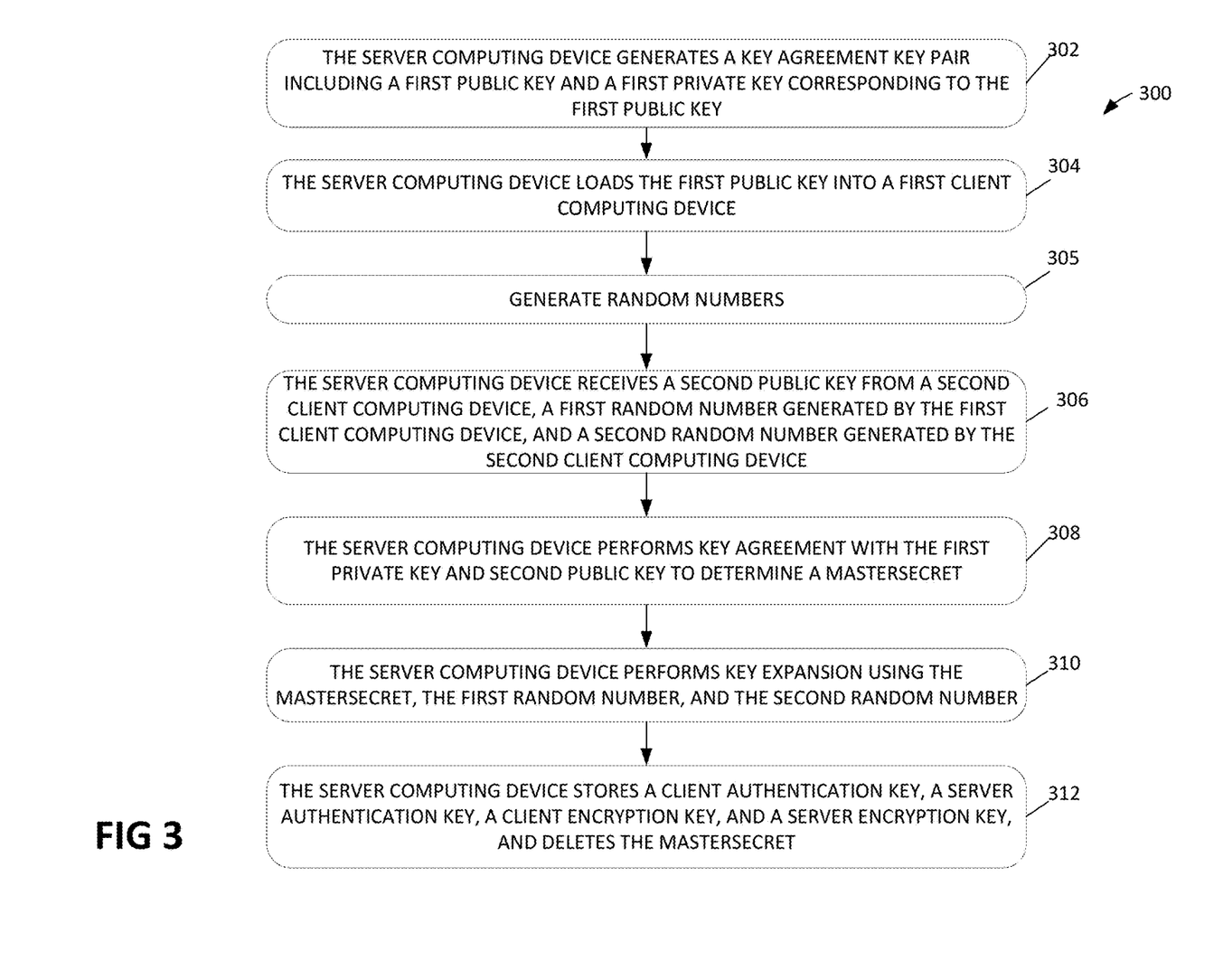
FIG. 3 illustrates a flowchart for securing an advanced metering infrastructure (AMI) device according to an example embodiment.

FIG. 3 illustrates a flowchart of a process 300 for securing an AMI device 104 according to an example embodiment. In step 302, the server computing device 106 generates a first key agreement key pair. The first key agreement key pair may be generated using ECDH or another encryption algorithm. The first key agreement key pair may include a first public key and a first private key corresponding to the first public key.

Next, in step 304, the server computing device 106 loads the key agreement key pair into the client computing device 102. In another example, the server computing device 106 may load the first public key into the client computing device 102. At step 305, random numbers are generated. In one embodiment, the client computing device 102 generates a first random number, e.g., serverRND. The first random number may be a thirty-two byte random number. The client computing device 102 may load the first public key and the serverRND into the AMI device 104.

In one embodiment, the AMI device 104 generates a second random number, e.g., clientRND. The second random number may be a thirty-two byte random number. The AMI device 104 may generate a second key agreement key pair. The second key agreement key pair may be generated using ECDH or another encryption algorithm. The second key agreement key pair may include a second public key and a second private key corresponding to the second public key. The AMI device 104 performs key agreement using the second private key and the first public key to determine a MasterSecret. The key agreement may be an ECDH key agreement and the MasterSecret may be a thirty-two byte output. The AMI device 104 may perform key expansion using the MasterSecret, the first random number, and the second random number to generate a client authentication key, a server authentication key, a client encryption key, and a server encryption key. The AMI device 104 may store the client authentication key, the server authentication key, the client encryption key, and the server encryption key and delete the MasterSecret.

Next, in step 306, the server computing device 106 may receive the second public key, the first random number, the second random number from the AMI device 104 and store the second public key, the first random number, and the second random number in an installation record associated with the AMI device 104. The installation record may be in memory of the server computing device 106 and/or the database 112. In step 308, the server computing device 106 may perform key agreement using the first private key and the second public key to determine the MasterSecret.

In step 310, the server computing device 106 may perform key expansion using the MasterSecret, the first random number, and the second random number to generate the client authentication key, the server authentication key, the client encryption key, and the server encryption key. In step 312, the server computing device 106 may store the client authentication key, the server authentication key, the client encryption key, and the server encryption key and delete the MasterSecret.

As an example, the key expansion may be performed by the AMI device 104 and the server computing device 106 using a key-hash message authentication code (HMAC). HMAC uses a particular key and a particular value to generate a hash-based message authentication code. In one example, the key expansion may be based on FIPS 198-1 HMAC that uses secure hash algorithm 256 (SHA-256). The particular key may be the MasterSecret and the value may be associated with the first random number and the second random number, among other values. The client authentication key may be generated using HMAC based on the MasterSecret, the first random number, and the second random number. The server authentication key may be generated using HMAC based on the client authentication key, the first random number, and the second random number. The client encryption key may be generated based on the server authentication key, the first random number, and the second random number. The server encryption key may be generated based on the client encryption key, the first random number, and the second random number.

Figure 4:
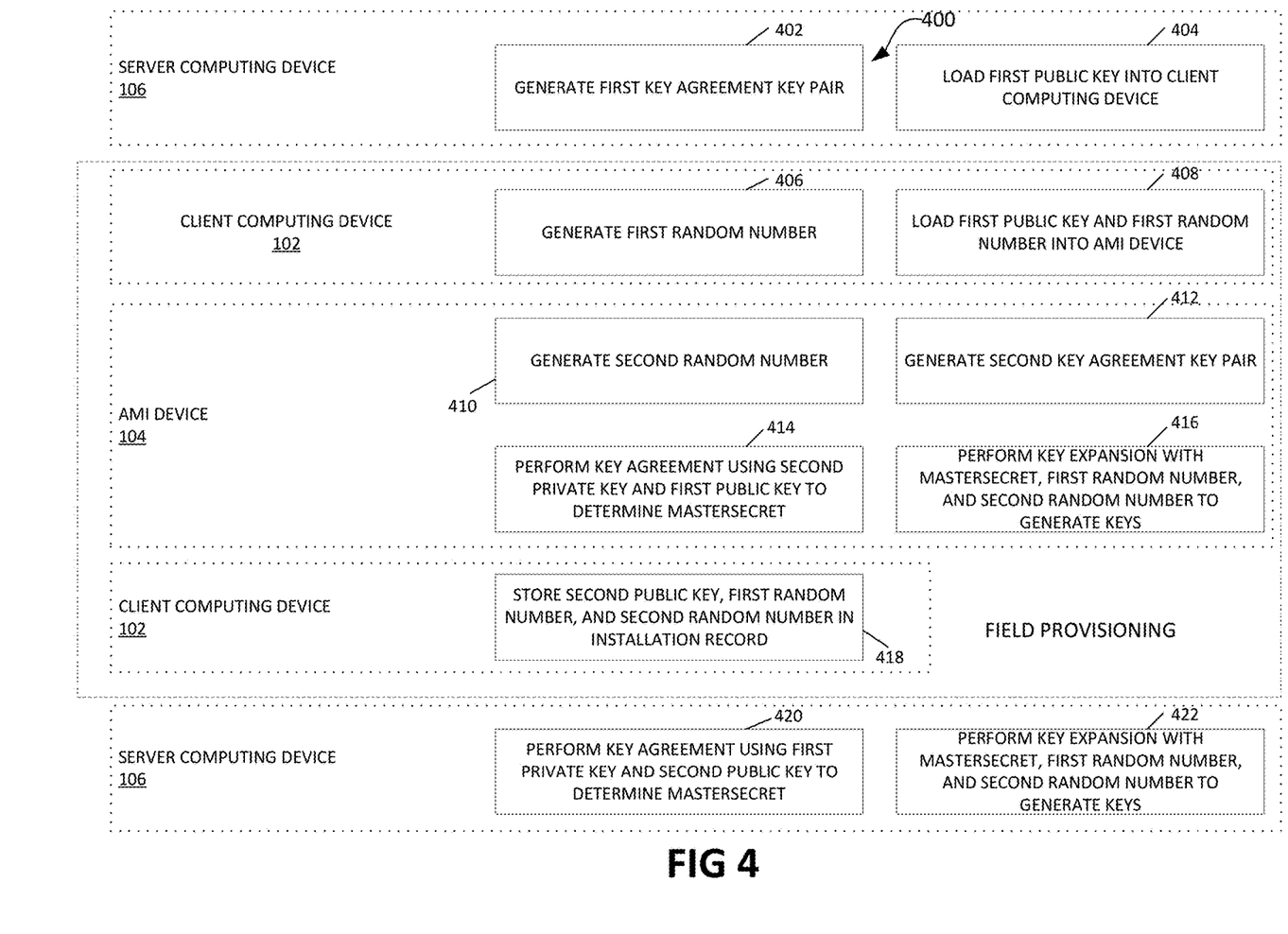
FIG. 4 illustrates another flowchart for securing the advanced metering infrastructure (AMI) device according to an example embodiment.

FIG. 4 illustrates a second flowchart of a process 400 for securing an AMI device 104 according to an example embodiment. In 402, the server computing device 106 generates a first key agreement key pair including a first private key and a first public key corresponding to the first private key.

Next, in 404, the server computing device 106 loads the key agreement key pair into the client computing device 102, e.g., the field programming tool. In another example, the server computing device 106 loads the first public key into the client computing device 102. As shown in FIG. 4, 406-418 are associated with field provisioning of the AMI device 104. In 406, the client computing device 102 generates a first random number, e.g., serverRND. In step 408, the client computing device 102 loads the first public key and the first random number into the AMI device 104. In 410, the AMI device 104 generates a second random number, e.g., clientRND.

In 412, the AMI device 104 generates a second key agreement key pair including a second private key and a second public key corresponding to the second private key. In 414, the AMI device 104 performs key agreement using the second private key and the first public key to determine a MasterSecret.

In 416, the AMI device 104 performs key expansion with the MasterSecret, the first random number, and the second random number to generate the client authentication key, the server authentication key, the client encryption key, and the server encryption key. The AMI device 104 may store the client authentication key, the server authentication key, the client encryption key, and the server encryption key. Next, the AMI device 104 may delete the MasterSecret.

In 418, the client computing device 102 may store the second public key, the first random number, and the second random number in an installation record associated with the AMI device 104. In 420, the server computing device 106 performs key agreement using the first private key and the second public key to determine the MasterSecret.

In 422, the server computing device 106 performs key expansion with the MasterSecret, the first random number, and the second random number to generate the client authentication key, the server authentication key, the client encryption key, and the server encryption key. The server computing device 106 may store the client authentication key, the server authentication key, the client encryption key, and the server encryption key. Next, the server computing device 106 may delete the MasterSecret.

In another embodiment, the client computing device 102, e.g., the field programming tool, may be absent from the system or not used. The server computing device 106 may create the first random number and all communication to the AMI device 104 would be via the communications network 108.

Figure 5:
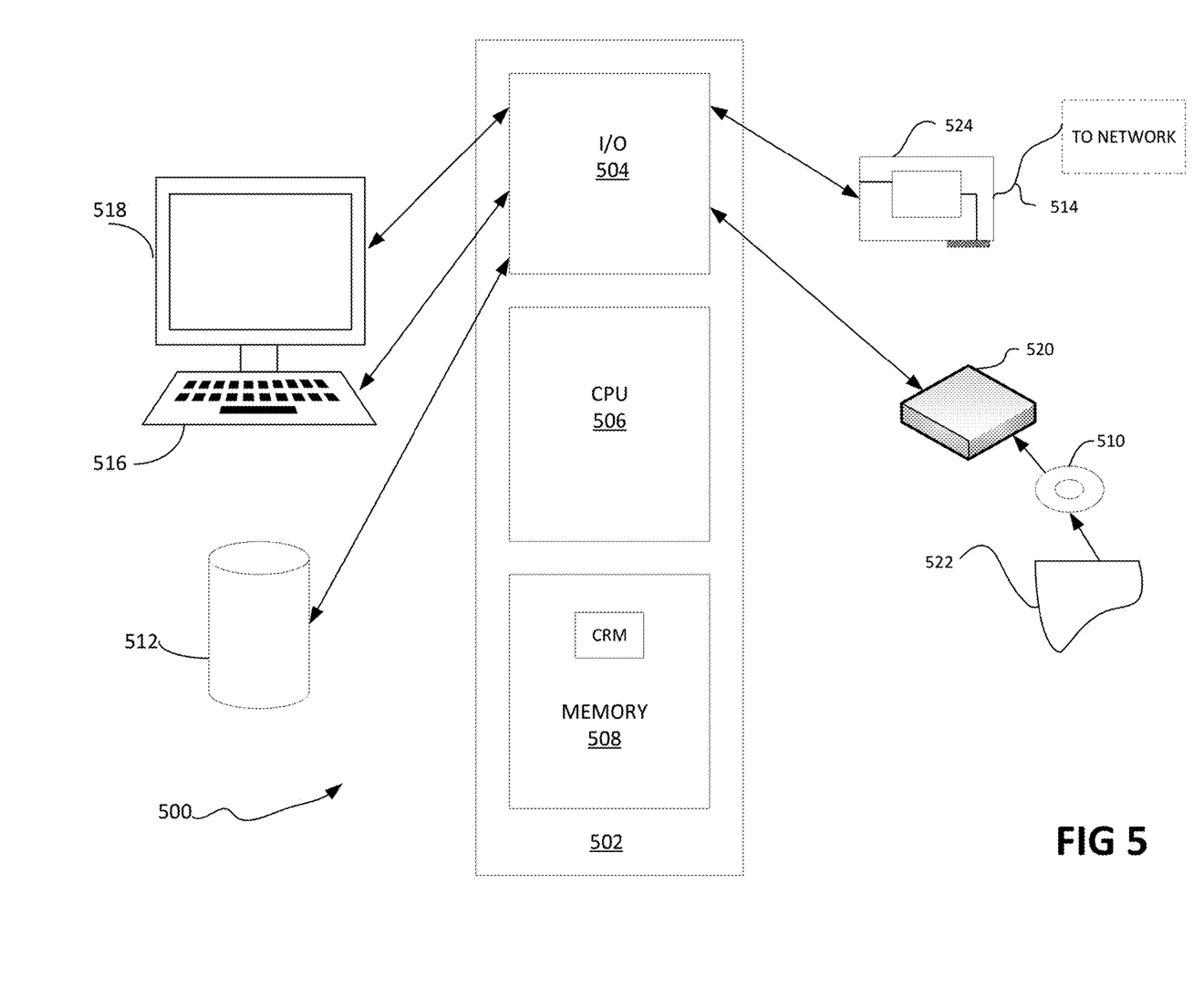
FIG. 5 illustrates a block diagram of a computing device according to an example embodiment.

FIG. 5 illustrates an example computing system 500 that may implement various systems, such as the client computing device 102, the AMI device 104, and the server computing device 106, and the methods discussed herein, such as process 300 and process 400. A general purpose computer system 500 is capable of executing a computer program product to execute a computer process. Data and program files may be input to the computer system 500, which reads the files and executes the programs therein such as the AMI security application 110. Some of the elements of a general purpose computer system 500 are shown in FIG. 5 wherein a processor 502 is shown having an input/output (I/O) section 504, a central processing unit (CPU) 506, and a memory section 508. There may be one or more processors 502, such that the processor 502 of the computer system 500 comprises a single central-processing unit 506, or a plurality of processing units, commonly referred to as a parallel processing environment. The computer system 500 may be a conventional computer, a server, a distributed computer, or any other type of computer, such as one or more external computers made available via a cloud computing architecture. The presently described technology is optionally implemented in software devices loaded in memory 508, stored on a configured DVD/CD-ROM 510 or storage unit 512, and/or communicated via a wired or wireless network link 514, thereby transforming the computer system 500 in FIG. 5 to a special purpose machine for implementing the described operations.

The memory section 508 may be volatile media, non-volatile media, removable media, non-removable media, and/or other media or mediums that can be accessed by a general purpose or special purpose computing device. For example, the memory section 508 may include non-transitory computer storage media and communication media. Non-transitory computer storage media further may include volatile, non-volatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 504 is connected to one or more user-interface devices (e.g., a keyboard 516 and a display unit 518), a disc storage unit 512, and a disc drive unit 520. Generally, the disc drive unit 520 is a DVD/CD-ROM drive unit capable of reading the DVD/CD-ROM medium 510, which typically contains programs and data 522. Computer program products containing mechanisms to effectuate the systems and methods in accordance with the presently described technology may reside in the memory section 504, on a disc storage unit 512, on the DVD/CD-ROM medium 510 of the computer system 500, or on external storage devices made available via a cloud computing architecture with such computer program products, including one or more database management products, web server products, application server products, and/or other additional software components. Alternatively, a disc drive unit 520 may be replaced or supplemented by another storage medium drive unit. The network adapter 524 is capable of connecting the computer system 500 to a network via the network link 514, through which the computer system can receive instructions and data. Examples of such systems include personal computers, Intel or PowerPC-based computing systems, AMD-based computing systems, ARM-based computing systems, and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 500 is connected (by wired connection and/or wirelessly) to a local network through the network interface or adapter 524, which is one type of communications device. When used in a WAN-networking environment, the computer system 500 typically includes a modem, a network adapter, or any other type of communications device for establishing communications over the wide area network. In a networked environment, program modules depicted relative to the computer system 500 or portions thereof, may be stored in a remote memory storage device. It is appreciated that the network connections shown are examples of communications devices for and other means of establishing a communications link between the computers may be used.

In an example implementation, source code executed by the client computing device 102, the AMI device 104, the server computing device 106, a plurality of internal and external databases, source databases, and/or cached data on servers are stored in memory of the client computing device 102, memory of the AMI device 104, memory of the server computing device 106, or other storage systems, such as the disk storage unit 512 or the DVD/CD-ROM medium 510, and/or other external storage devices made available and accessible via a network architecture. The source code executed by the client computing device 102, the AMI device 104, and the server computing device 106 may be embodied by instructions stored on such storage systems and executed by the processor 502.

Some or all of the operations described herein may be performed by the processor 502, which is hardware. Further, local computing systems, remote data sources and/or services, and other associated logic represent firmware, hardware, and/or software configured to control operations of the AMI system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 502 and a user may interact with a Graphical User Interface (GUI) using one or more user-interface devices (e.g., the keyboard 516, the display unit 518, and the user devices 504) with some of the data in use directly coming from online sources and data stores. The system set forth in FIG. 5 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
a first client computing device;
a second client computing device; and
a server computing device, the server computing device including:
a memory storing computer-executable instructions; and
at least one processor configured to:
generate a first key agreement key pair comprising a first public key and a first private key corresponding to the first public key;
receive a second public key associated with a second key agreement key pair comprising the second public key and a second private key generated by the second client computing device, a first random number generated by the first client computing device, and a second random number generated by the second client computing device;
perform key agreement with the first private key and the second public key to determine a MasterSecret; and
perform key expansion with the MasterSecret, the first random number, and the second random number to generate a client authentication key and at least one of a server authentication key, a client encryption key, and a server encryption key.

2. The system of claim 1, the at least one processor further to generate the key agreement pair using Elliptic-curve Diffie-Hellman (ECDH).

3. The system of claim 1, wherein the second client computing device performs key agreement with the second private key and the first public key to determine the MasterSecret, performs key expansion with the MasterSecret, the first random number, and the second random number, to generate the client authentication key, the server authentication key, the client encryption key, and the server encryption key, and stores the client authentication key, the server authentication key, the client encryption key, and the server encryption key and deletes the MasterSecret.

4. The system of claim 1, wherein the at least one processor is further configured to store the at least one of the client authentication key, the server authentication key, the client encryption key, and the server encryption key and delete the MasterSecret.

5. The system of claim 1, wherein the second client computing device is an advanced metering infrastructure (AMI) device.

6. The system of claim 1, wherein the at least one processor of the server computing device is further configured to perform the key expansion with the MasterSecret using a hash-based message authentication code (HMAC).

7. The system of claim 6, wherein the at least one processor of the server computing device is further configured to generate the client authentication key using HMAC based on the MasterSecret, the first random number, and the second random number.

8. The system of claim 7, wherein the at least one processor of the server computing device is further configured to generate the server authentication key using HMAC based on the MasterSecret, the client authentication key, the first random number, and the second random number.

9. The system of claim 8, wherein the at least one processor of the server computing device is further configured to generate the client encryption key using HMAC based on the MasterSecret, the server authentication key, the first random number, and the second random number.

10. The system of claim 9, wherein the at least one processor of the server computing device is further configured to generate the server encryption key using HMAC based on the MasterSecret, the client encryption key, the first random number, and the second random number.

11. A method comprising:
generating, by at least one processor of a server computing device, a first key agreement key pair comprising a first public key and a first private key corresponding to the first public key;
receiving, by the at least one processor of the server computing device, a second public key associated with a second key agreement key pair comprising the second public key and a second private key generated by a second client computing device, a first random number generated by the first client computing device, and a second random number generated by the second client computing device;
performing, by the at least one processor of the server computing device, key agreement with the first private key and the second public key to determine a MasterSecret;
performing, by the at least one processor, key expansion with the MasterSecret, the first random number, and the second random number to generate a client authentication key and at least one of a server authentication key, a client encryption key, and a server encryption key.

12. The method of claim 11, further comprising generating the key agreement pair using Elliptic-curve Diffie-Hellman (ECDH).

13. The method of claim 11, wherein the second client computing device performs key agreement with the second private key and the first public key to determine the MasterSecret, performs key expansion with the MasterSecret, the first random number, and the second random number, to generate the client authentication key and the at least one of the server authentication key, the client encryption key, and the server encryption key, and stores the client authentication key and the at least one of the server authentication key, the client encryption key, and the server encryption key and deletes the MasterSecret.

14. The method of claim 11, wherein the second client computing device is an advanced metering infrastructure (AMI) device.

15. The method of claim 11, further comprising performing the key expansion with the MasterSecret using a hash-based message authentication code (HMAC).

16. The method of claim 15, further comprising generating the client authentication key using HMAC based on the MasterSecret, the first random number, and the second random number.

17. The method of claim 16, further comprising generating the server authentication key using HMAC based on the MasterSecret, the client authentication key, the first random number, and the second random number.

18. The method of claim 17, further comprising generating the client encryption key using HMAC based on the MasterSecret, the server authentication key, the first random number, and the second random number.

19. The method of claim 18, further comprising generating the server encryption key using HMAC based on the MasterSecret, the client encryption key, the first random number, and the second random number.

20. A non-transitory computer-readable storage medium, having instructions stored thereon that, when executed by a computing device causes the computing device to perform operations, the operations comprising:
- generating a first key agreement key pair comprising a first public key and a first private key corresponding to the first public key;
- receiving a second public key associated with a second key agreement key pair comprising the second public key and a second private key generated by a second client computing device, a first random number generated by the first client computing device, and a second random number generated by the second client computing device;
- performing key agreement with the first private key and the second public key to determine a MasterSecret;
- performing key expansion with the MasterSecret, the first random number, and the second random number to generate a client authentication key and at least one of a server authentication key, a client encryption key, and a server encryption key.

* * * * *